US008500840B2

(12) United States Patent
Okazaki et al.

(10) Patent No.: US 8,500,840 B2
(45) Date of Patent: Aug. 6, 2013

(54) CORDIERITE-BASED CERAMIC HONEYCOMB FILTER AND ITS PRODUCTION METHOD

(75) Inventors: Shunji Okazaki, Miyako-gun (JP); Toshitaka Ishizawa, Miyako-gu (JP)

(73) Assignee: Hitachi Metals, Ltd., Tokyo (JP)

( * ) Notice: Subject to any disclaimer, the term of this patent is extended or adjusted under 35 U.S.C. 154(b) by 568 days.

(21) Appl. No.: 12/682,476

(22) PCT Filed: Oct. 14, 2008

(86) PCT No.: PCT/JP2008/068605
§ 371 (c)(1),
(2), (4) Date: Apr. 9, 2010

(87) PCT Pub. No.: WO2009/048156
PCT Pub. Date: Apr. 16, 2009

(65) Prior Publication Data
US 2010/0205921 A1    Aug. 19, 2010

(30) Foreign Application Priority Data

Oct. 12, 2007    (JP) .................................. 2007-267119

(51) Int. Cl.
*B01D 39/14* (2006.01)
*B01D 39/06* (2006.01)
*B01D 50/00* (2006.01)
*B01D 24/00* (2006.01)
*F01N 3/00* (2006.01)

(52) U.S. Cl.
USPC ................. 55/523; 55/522; 55/524; 422/169; 422/170; 422/171; 422/172; 422/179; 422/180; 422/181; 422/182; 422/177; 422/178; 60/297

(58) Field of Classification Search
USPC ........... 55/522–524; 422/169–172, 177–182; 60/297
See application file for complete search history.

(56) References Cited

U.S. PATENT DOCUMENTS 5,545,243 A * 8/1996 Kotani et al. ................... 55/523
6,773,481 B2 * 8/2004 Noguchi et al. ................ 55/523
(Continued)

FOREIGN PATENT DOCUMENTS

EP    1997788 A1    12/2008
JP    61-129015 A    6/1986
(Continued)

OTHER PUBLICATIONS

European search report dated Mar. 20, 2012 issued in European Patent Application No. 08838157.9.

*Primary Examiner* — Amber Orlando
(74) *Attorney, Agent, or Firm* — Sughrue Mion, PLLC

(57) ABSTRACT

A cordierite-based ceramic honeycomb filter comprising a honeycomb structure having a large number of flow paths partitioned by porous cell walls, and plugs alternately formed in said flow paths on the exhaust-gas-inlet side or the exhaust-gas-outlet side for permitting an exhaust gas to pass through said porous cell walls to remove particulate matter from the exhaust gas, said porous cell walls having porosity of 45-58%, an average pore size of 15-30 μm, the volume of pores having pore sizes exceeding 50 μm being more than 10% and 25% or less of the total pore volume, the volume of pores having pore sizes of 100 μm or more being 1-8% of the total pore volume, the volume of pores having pore sizes of less than 10 μm being 3-10% of the total pore volume, and said pores having a pore size distribution deviation σ [=log (D20)−log(D80)] of 0.6 or less, wherein D20 represents a pore size (μm) at a pore volume corresponding to 20% of the total pore volume, and D80 represents a pore size (μm) at a pore volume corresponding to 80% of the total pore volume, both in a curve representing the relation between the pore size and the cumulative pore volume, and D80<D20.

3 Claims, 4 Drawing Sheets

U.S. PATENT DOCUMENTS

| | | | |
|---|---|---|---|
| RE38,888 E * | 11/2005 | Beall et al. | 501/119 |
| 7,744,670 B2 * | 6/2010 | Miao et al. | 55/523 |
| 7,867,598 B2 * | 1/2011 | Miyairi et al. | 428/116 |
| 7,887,897 B2 * | 2/2011 | Lu et al. | 428/116 |
| 7,981,188 B2 * | 7/2011 | Miao et al. | 55/523 |
| 8,187,525 B2 * | 5/2012 | Custer et al. | 264/666 |
| 8,283,282 B2 * | 10/2012 | Noguchi et al. | 502/439 |
| 2003/0041574 A1 | 3/2003 | Noguchi et al. | |
| 2003/0093982 A1 * | 5/2003 | Suwabe et al. | 55/523 |
| 2004/0261384 A1 * | 12/2004 | Merkel et al. | 55/523 |
| 2006/0107641 A1 | 5/2006 | Kasai et al. | |
| 2007/0045909 A1 | 3/2007 | Watanabe et al. | |
| 2007/0048494 A1 * | 3/2007 | Miyairi et al. | 428/116 |
| 2007/0107397 A1 | 5/2007 | Merkel et al. | |
| 2007/0107398 A1 | 5/2007 | Merkel et al. | |
| 2007/0119133 A1 * | 5/2007 | Beall et al. | 55/523 |
| 2007/0119135 A1 * | 5/2007 | Miao et al. | 55/523 |
| 2007/0204580 A1 * | 9/2007 | Kunieda | 55/523 |
| 2007/0225149 A1 | 9/2007 | Hayashi et al. | |
| 2007/0261378 A1 * | 11/2007 | Miao et al. | 55/523 |
| 2008/0110143 A1 * | 5/2008 | Chen et al. | 55/385.1 |
| 2009/0011919 A1 | 1/2009 | Noguchi et al. | |
| 2009/0062105 A1 * | 3/2009 | Custer et al. | 501/80 |

FOREIGN PATENT DOCUMENTS

| | | |
|---|---|---|
| JP | 2002-219319 A | 8/2002 |
| JP | 2003-193820 A | 7/2003 |
| JP | 2004-250324 A | 9/2004 |
| JP | 2004-322082 A | 11/2004 |
| JP | 2005-296936 A | 10/2005 |
| JP | 2005-324154 A | 11/2005 |
| JP | 2006-095352 A | 4/2006 |
| JP | 2007-045686 A | 2/2007 |
| WO | 2005/090263 A1 | 9/2005 |

* cited by examiner

CORDIERITE-BASED CERAMIC HONEYCOMB FILTER AND ITS PRODUCTION METHOD

CROSS REFERENCE TO RELATED APPLICATIONS

This application is a National Stage of International Application No. PCT/JP2008/068605 filed Oct. 14, 2008, claiming priority based on Japanese Patent Application No. 2007-267119 filed Oct. 12, 2007, the contents of all of which are incorporated herein by reference in their entirety.

FIELD OF THE INVENTION

The present invention relates to a cordierite-based ceramic honeycomb filter for removing particulate matter from exhaust gases discharged from diesel engines.

BACKGROUND OF THE INVENTION

Exhaust gases from diesel engines contain particulate matter (PM) based on carbonaceous soot and SOFs (soluble organic fractions) of high-boiling-point hydrocarbons, and the release of PM into the atmosphere is likely to exert adverse effects on humans and environment. Exhaust pipes connected to diesel engines are thus conventionally provided with ceramic honeycomb filters (simply called "honeycomb filters" below) for capturing PM.

FIGS. 1(a) and 1(b) show one example of honeycomb filters for capturing PM to clean the exhaust gas. A honeycomb filter 10 comprises a ceramic honeycomb structure having porous cell walls 2 for constituting large numbers of outlet-side-sealed flow paths 3 and inlet-side-sealed flow paths 4 and a peripheral wall 1, and upstream-side plugs 6a and downstream-side plugs 6c for sealing the exhaust-gas-inlet-side end surface 8 and exhaust-gas-outlet-side end surface 9 of the outlet-side-sealed flow paths 3 and inlet-side-sealed flow paths 4 alternately in a checkerboard pattern.

As shown in FIG. 2, this ceramic honeycomb filter 10 is received in a metal container 12, axially gripped by a support member 14, and sandwiched by support members 13a, 13b. The support member 14 is generally formed by a metal mesh and/or ceramic material. When the ceramic honeycomb filter 10 attached to a diesel engine is used, mechanical vibration and shock are conveyed from the engine, the road, etc. to the ceramic honeycomb filter 10 via the support members 13a, 13b and 14, so that the ceramic honeycomb filter 10 is subjected to a load. Particularly because industrial ceramic filters used for construction machines, etc., or large ceramic honeycomb filters of more than 200 mm in outer diameter are subjected to a larger load by vibration and shock, they are required to have higher strength than that of conventional ones.

The ceramic honeycomb filters should have three important characteristics, particulate-matter-capturing efficiency, pressure loss, and particulate-matter-capturing time (time period from the start of capturing particulate matter, during which pressure loss reaches a predetermined level). Particularly the capturing efficiency and the pressure loss are in a reciprocal relation; higher capturing efficiency results in larger pressure loss and shorter capturing time, and lower pressure loss results in longer capturing time and poorer capturing efficiency. To meet all of these contradictory filter characteristics, investigation has conventionally been conducted to develop technologies for controlling the porosity and average pore size of the ceramic honeycomb structures, and pore sizes on their cell wall surfaces.

JP 61-129015 A discloses a low-pressure-loss, exhaust-gas-cleaning filter having pores on the cell wall surfaces, the pores comprising small pores having pore sizes of 5-40 µm and large pores having pore sizes of 40-100 µm, the number of said small pores being 5-40 times that of said large pores, thereby having high capturing efficiency from the start. This reference describes that pores in the cell walls preferably have an average pore size of more than 15 µm and a cumulative pore volume of 0.3-0.7 cm$^3$/g. Because the porosity P (% by volume) of cell walls can be calculated from the true specific gravity ρ (=2.5 g/cm$^3$) and cumulative pore volume V (cm$^3$/g) of a cordierite material by the formula of P=100×V×ρ/(1+V× ρ), the cumulative pore volume of 0.3-0.7 cm$^3$/g in said cell walls can be converted to the porosity of 42.8-63.6% by volume. The pore size distribution line shown in FIG. 4 in JP 61-129015 A indicates that the honeycomb filters of Examples 1, 2, 5 and 6 have cumulative pore volumes of 0.58 cm$^3$/g (porosity 59%), 0.4 cm$^3$/g (porosity 50%), 0.7 cm$^3$/g (porosity 64%) and 0.3 cm$^3$/g (porosity 43%), respectively, and average pore sizes of 40 µm, 35 µm, 44 µm and 15 µm, respectively.

However, particularly when used for industrial ceramic filters for construction machines, etc. or large ceramic honeycomb filters of more than 200 mm in outer diameter, the honeycomb filters of Examples 1, 2 and 5 have too large average pore sizes or porosities, resulting in insufficient strength, and the honeycomb filter of Example 6 has too small porosity, resulting in high pressure loss. Namely, the honeycomb filters of Examples 1, 2, 5 and 6 do not have both low pressure loss and high strength.

JP 2002-219319 A discloses a porous honeycomb filter, in which the volume of pores having pore sizes of less than 10 µm is 15% or less of the total pore volume, the volume of pores having pore sizes of 10-50 µm is 75% or more of the total pore volume, and the volume of pores having pore sizes exceeding 50 µm is 10% or less of the total pore volume. This reference describes that this porous honeycomb filter has high particulate-matter-capturing efficiency while preventing increase in pressure loss due to the clogging of pores. However, the porous honeycomb filter described in JP 2002-219319 A does not have sufficiently low pressure loss particularly when used as industrial filters for construction machines, etc., or large filters of more than 200 mm in outer diameter.

JP 2004-322082 A discloses a ceramic honeycomb filter having a total pore volume of 0.55-0.80 cm$^3$/g (corresponding to porosity of 59-67% when converted by the above formula), the volume of pores of 100 µm or more being 0.02-0.10 cm$^3$/g. This reference describes that this filter has low pressure loss and high strength. In high-porosity ceramic honeycomb filters as described in JP 2004-322082 A, however, there is still room for improvement to meet both low pressure loss and sufficient strength to withstand mechanical vibration and shock, particularly when used as industrial filters for construction machines, etc. or large filters of more than 200 mm in outer diameter.

JP 2004-250324 A discloses a method for producing a ceramic honeycomb structure using a cordierite-forming material containing 10-20% by mass of silica particles, in which the percentage of particles having particle sizes of 75-250 µm is more than 1% by mass and 10% by mass or less. This reference describes that the ceramic honeycomb filter has low pressure loss and high strength. However, the use of quartz and silica particles shown in Table 2 of JP 2004-250324 A provides ceramic honeycomb filters with too high percentage of fine pores, resulting in high pressure loss. In addition, because the ceramic honeycomb filters described in JP 2004-250324 A have high porosity, there is still room for improvement to meet both low pressure loss and sufficient strength to withstand mechanical vibration and shock, particularly when used as industrial filters for construction machines, etc. or large filters of more than 200 mm in outer diameter.

JP 2003-193820 A discloses a ceramic honeycomb filter having cell walls having porosity of 60% or more and an average pore size of 15 μm or more, the maximum inclination of a cumulative pore volume distribution curve plotted with the pore size being 0.7 or more. This reference describes that the ceramic honeycomb filter has low pressure loss, and high strength and durability. However, because the ceramic honeycomb filters described in JP 2003-193820 A have high porosity, there is still room for improvement to meet both low pressure loss and sufficient strength to withstand mechanical vibration and shock, particularly when used as industrial filters for construction machines, etc. or large filters of more than 200 mm in outer diameter.

OBJECT OF THE INVENTION

Accordingly, an object of the present invention is to provide a ceramic honeycomb filter having low pressure loss and improved strength to withstand mechanical vibration and shock, even when used as industrial ceramic honeycomb filters for construction machines, etc. or large ceramic honeycomb filters of more than 200 mm in outer diameter.

DISCLOSURE OF THE INVENTION

As a result of intensive research in view of the above object, the inventors have found that a well-balanced combination of pores effective for low pressure loss and pores effective for high strength can prevent the pressure loss from deteriorating with relatively low porosity. The present invention has been completed based on such finding.

Thus, the cordierite-based ceramic honeycomb filter of the present invention comprises a honeycomb structure having a large number of flow paths partitioned by porous cell walls, and plugs alternately formed in said flow paths on the exhaust-gas-inlet side or the exhaust-gas-outlet side for permitting an exhaust gas to pass through said porous cell walls to remove particulate matter from the exhaust gas, said porous cell walls having porosity of 45-58%, an average pore size of 15-30 μm, the volume of pores having pore sizes exceeding 50 μm being more than 10% and 25% or less of the total pore volume, the volume of pores having pore sizes of 100 μm or more being 1-8% of the total pore volume, the volume of pores having pore sizes of less than 10 μm being 3-10% of the total pore volume, and said pores having a pore size distribution deviation σ [=log(D20)−log(D80)] of 0.6 or less, wherein D20 represents a pore size (μm) at a pore volume corresponding to 20% of the total pore volume, and D80 represents a pore size (μm) at a pore volume corresponding to 80% of the total pore volume, both in a curve representing the relation between the pore size and the cumulative pore volume (pore volume accumulated in a range from the maximum pore size to a particular pore size), and D80<D20.

Said cumulative pore volume is preferably measured by mercury porosimetry.

The A-axis compression strength of said ceramic honeycomb structure is preferably 4 MPa or more.

The method of the present invention for producing a cordierite-based ceramic honeycomb filter comprises the steps of extruding a moldable material comprising a cordierite-forming material containing silica and a pore-forming material to a predetermined molding, and plugging the predetermined flow paths of said molding, said silica being contained in said cordierite-forming material in an amount of 10-20% by mass, said silica particles having a mode diameter of 30-70 μm, particles having particle sizes of 200 μm or more being 1% or less, particles having particle sizes of 100 μm or more being 2-10%, and particles having particle sizes of 20 μm or less being 2-10%, and said silica particles also having a particle size distribution deviation SD [=log(d80)−log(d20)] of 0.5 or less, wherein d20 represents a particle size (μm) at a cumulative volume of 20%, and d80 represents a particle size (μm) at a cumulative volume of 80%, both in a curve representing the relation between the particle size and the cumulative volume (indicating the percentage of the volume of particles having particle sizes equal to or less than a particular level), and d20<d80.

Said pore-forming material is preferably contained in said cordierite-forming material in an amount of 1-10%, and said pore-forming material particles preferably have a mode diameter of 30-70 μm, and a particle size distribution deviation SD of 0.5 or less.

The absolute difference $|M_{50}-m_{50}|$ is preferably 15 μm or less, wherein $M_{50}$ is a mode diameter of said silica particles, and $m_{50}$ is a mode diameter of said pore-forming material particles.

$SD_1-SD_2$ is preferably 0.3 or less, wherein $SD_1$ is the particle size distribution deviation of silica particles, and $SD_2$ is the particle size distribution deviation of pore-forming material particles.

The roundness of said silica is preferably 0.6 or more.

DESCRIPTION OF THE PREFERRED EMBODIMENTS

[1] Ceramic Honeycomb Filter

Figure 1A:
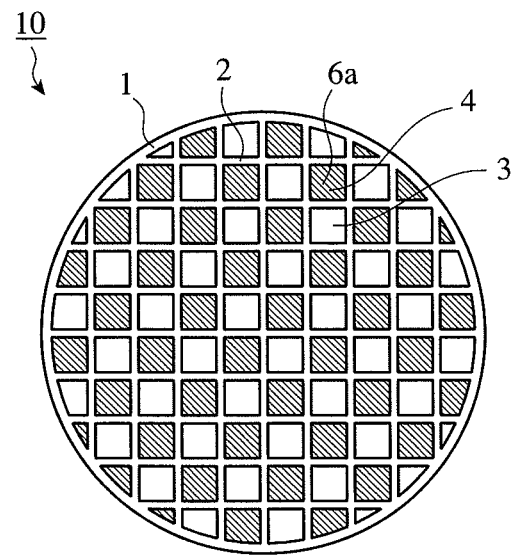
FIG. 1(a) is a schematic cross-sectional view showing one example of honeycomb filters perpendicularly to the flow paths.
Figure 1B:
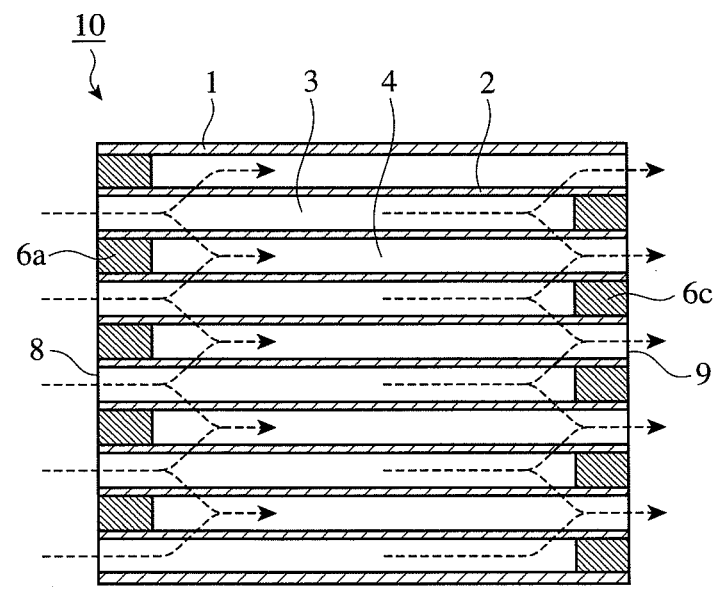
FIG. 1(b) is a schematic cross-sectional view showing one example of honeycomb filters in parallel to the flow paths.
Figure 2:
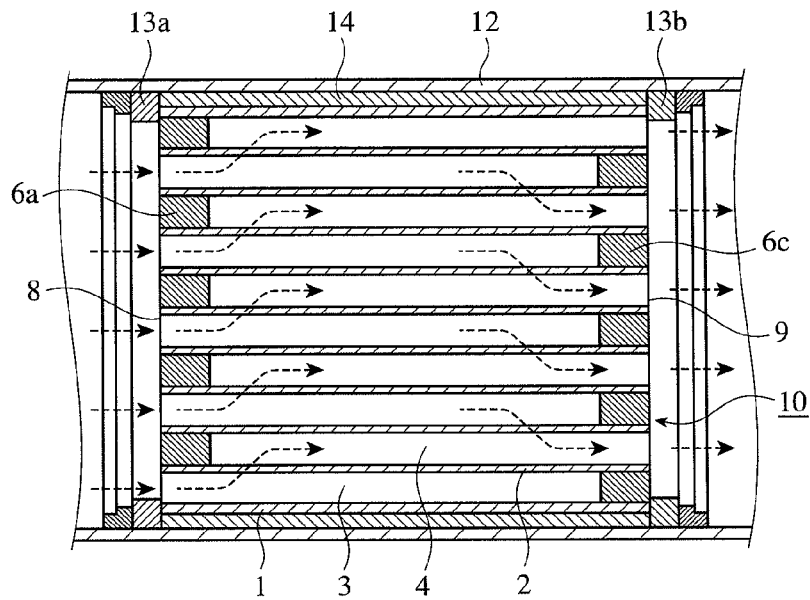
FIG. 2 is a schematic cross-sectional view showing one example of ceramic honeycomb filters received in a metal container.

The ceramic honeycomb filter of the present invention is a cordierite-based ceramic honeycomb filter comprising a honeycomb structure having a large number of flow paths partitioned by porous cell walls, and plugs alternately formed in said flow paths on the exhaust-gas-inlet side or the exhaust-gas-outlet side, thereby permitting an exhaust gas to pass through said porous cell walls to remove particulate matter from the exhaust gas, said porous cell walls having porosity of 45-58% and an average pore size of 15-30 μm, the volume of pores having pore sizes of more than 50 μm being more than 10% and 25% or less of the total pore volume, the volume of pores having pore sizes of 100 μm or more being 1-8% of the total pore volume, the volume of pores having pore sizes of less than 10 μm being 3-10% of the total pore volume, and said pores having a pore size distribution deviation σ [=log (D20)−log(D80)] of 0.6 or less, wherein D20 represents a pore size (μm) at a pore volume corresponding to 20% of the total pore volume, and D80 represents a pore size (μm) at a pore volume corresponding to 80% of the total pore volume, both in a curve representing the relation between the pore size and the cumulative pore volume (pore volume accumulated in a range from the maximum pore size to a particular pore size), and D80<D20. Namely, with porous cell walls having many pores contributing to low pressure loss, few fine pores detrimental to low pressure loss, and few large pores detrimental to high strength, a ceramic honeycomb filter having both low pressure loss and high strength can be obtained.

The porous cell walls having porosity of less than 45% provide large pressure loss, and the porous cell walls having porosity of more than 58% fail to provide sufficient strength. Said porosity is preferably 48-57%, more preferably 50-56%.

The average pore size of less than 15 μm provides large pressure loss, and the average pore size exceeding 30 μm fails to provide sufficient strength. Said average pore size is preferably 19-28 μm, more preferably 20-27 μm.

When the volume of pores having pore sizes exceeding 50 μm is 10% or less of the total pore volume, there is large pressure loss. When it is more than 25%, the filter has extremely reduced strength. The volume of pores having pore sizes exceeding 50 μm is preferably 12-23% of the total pore volume.

When the volume of pores having pore sizes of 100 μm or more is less than 1% of the total pore volume, there is large pressure loss. When it exceeds 8%, the filter has extremely reduced strength. The volume of pores having pore sizes of 100 μm or more is preferably 2-7% of the total pore volume.

Pores having pore sizes of less than 10 μm secure the communicability of pores having pore sizes of 10 μm or more, thereby decreasing pressure loss. When the volume of pores having pore sizes of less than 10 μm is less than 3% of the total pore volume, the communicability of pores is not well secured, resulting in large pressure loss. When it exceeds 10%, the communicability of pores is secured, but a relatively small percentage of pores having pore sizes exceeding 10 μm deteriorates the pressure loss. The volume of pores having pore sizes of less than 10 μm is preferably 4-8% of the total pore volume.

Figure 3:
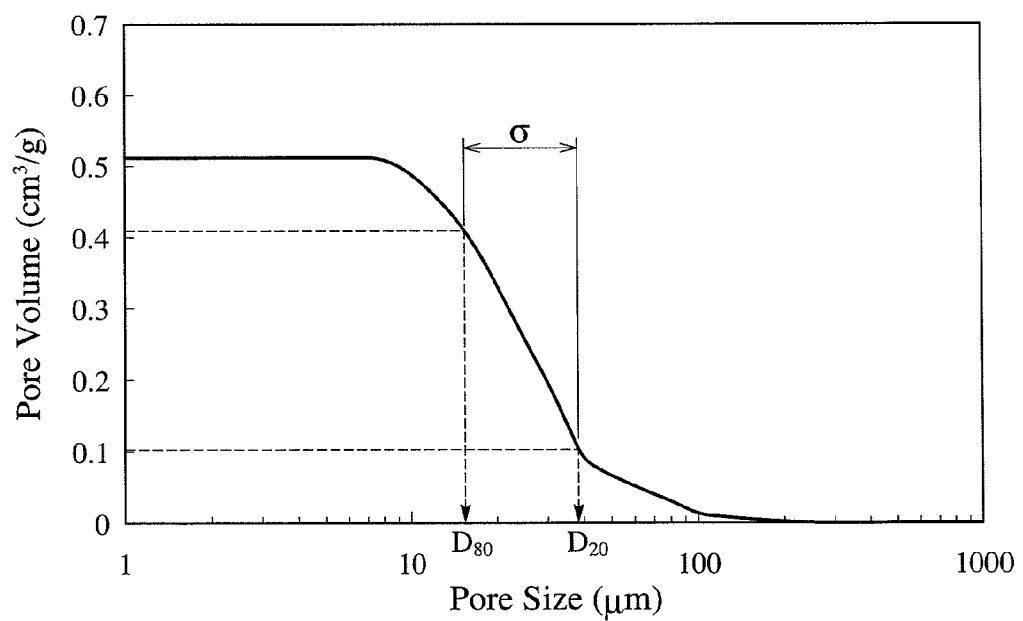
FIG. 3 is a graph showing the relation between a pore size and a pore volume in Example 11 within the present invention.

With cell walls having the above porosity, average pore size and pore size distribution, there are a high percentage of pores having an average pore size of 15-30 μm, when the pore size distribution deviation σ is 0.6 or less. Namely, the pores have a sharp pore size distribution, resulting in more pores contributing to low pressure loss and not detrimental to strength. When the pore size distribution deviation exceeds 0.6, the percentage of pores detrimental to pressure loss and strength increases, failing to obtain a ceramic honeycomb filter having low pressure loss and high strength. Said pore size distribution deviation σ is preferably 0.5 or less, more preferably 0.45 or less.

σ=log(D20)−log(D80), wherein D20 represents a pore size (μm) at a pore volume corresponding to 20% of the total pore volume, and D80 represents a pore size (μm) at a pore volume corresponding to 80% of the total pore volume, both in a curve representing the relation between the pore size and the cumulative pore volume (pore volume accumulated in a range from the maximum pore size to a particular pore size), and D80<D20, as shown in FIG. 3. Said pore size and the cumulative pore volume can be measured by a mercury intrusion method, particularly by a mercury porosimeter.

To obtain a ceramic honeycomb filter having high strength, the porous cell walls preferably have pores with circular cross sections.

The ceramic honeycomb filter of the present invention preferably has A-axis compression strength of 4 MPa or more. When the A-axis compression strength is less than 4 MPa, ceramic honeycomb filters for industrial applications such as construction machines, and large ceramic honeycomb filters having outer diameters of more than 200 mm are not likely to have sufficient strength to withstand mechanical vibration and shock. Said A-axis compression strength is preferably 5 MPa or more, more preferably 6 MPa or more.

To prevent heat shock cracking due to rapid heating and cooling during operation, the cell walls preferably have a thermal expansion coefficient (average thermal expansion coefficient between 40° C. and 800° C.) of $1.2 \times 10^{-6}$/° C. or less.

To have both low pressure loss and high strength, the cell walls are preferably as thick as 0.1-0.5 mm with a cell pitch of 1-3 mm.

[2] Production Method of Ceramic Honeycomb Filter

Figure 5:
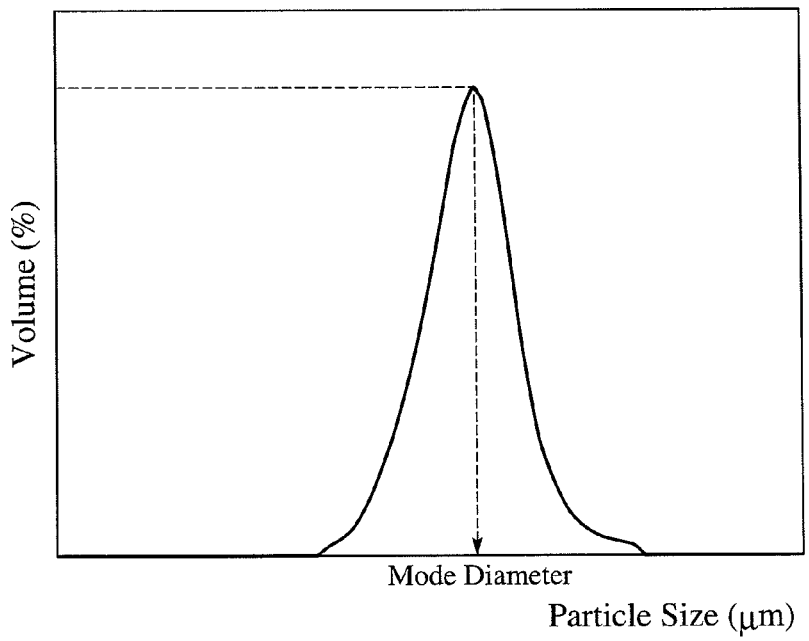
FIG. 5 is a graph showing a mode diameter in a particle size distribution curve.

The production method of the ceramic honeycomb filter of the present invention comprises extruding a moldable material comprising a cordierite-forming material containing silica particles and a pore-forming material to a predetermined molding, and plugging predetermined flow paths, said silica particles being contained in an amount of 10-20% by mass in said cordierite-forming material, and said silica particles having a mode diameter of 30-70 μm, and a particle size distribution deviation SD of 0.5 or less, particles having particle sizes of 200 μm or more being 1% or less, particles having particle sizes of 100 μm or more being 2-10%, and particles having particle sizes of 20 μm or less being 2-10%. The mode diameter is, as shown in FIG. 5, a particle size having the maximum volume in a particle size distribution curve representing the percentages (% by volume) of particle size fractions of particles.

Figure 4:
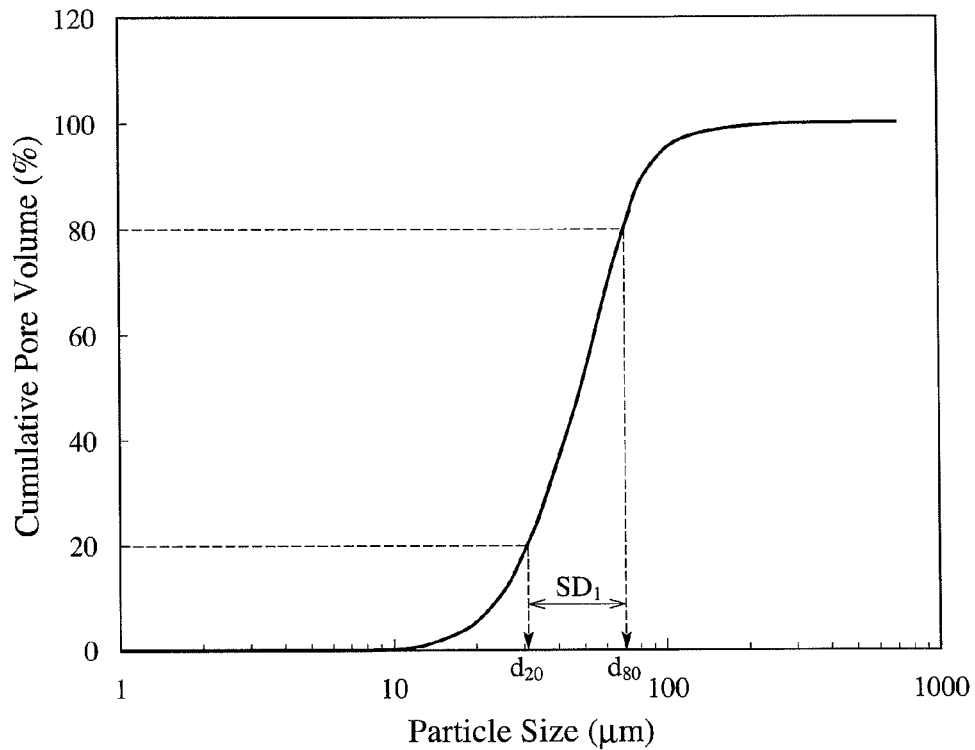
FIG. 4 is a graph showing the particle size distribution of silica used in Example 11 within the present invention.

SD=log(d80)−log(d20), wherein d20 represents, as shown in FIG. 4, a particle size (μm) at the cumulative volume of 20% in a cumulative particle size distribution curve representing the relation between particle sizes and their cumulative volumes, which shows the percentage (% by volume) of particles having particular particle sizes or less, d80 similarly represents a particle size (μm) at the cumulative volume of 80%, and d20<d80. Talc particles contained in the cordierite-forming material also preferably have a particle size distribution deviation SD of 0.5 or less. The particle sizes of silica particles, talc particles, etc. can be measured by a Microtrac particle size analyzer (MT3000).

Pores in the cordierite-based ceramic are mainly formed by voids generated by melting silica particles during sintering. The silica particles are more stable than other materials up to high temperatures, and melted and diffused at 1300° C. or higher, forming pores. With 10-20% of silica in the cordierite-forming material, the desired amount of pores is obtained. When more than 20% of silica is contained, other silica sources such as kaolin and talc should be reduced to keep cordierite as a main crystal, resulting in insufficient reduction of the thermal expansion coefficient in an orientation direction by extrusion, and thus low heat shock resistance. On the other hand, when the silica content is less than 10%, fewer pores are formed, failing to provide a ceramic honeycomb filter with low pressure loss. The silica content is preferably 13-18%.

With the mode diameter and particle size distribution of silica particles optimized by the method of the present invention, pores formed by sintering the cordierite-based ceramic can be controlled, resulting in porous cell walls with the above pore structure, thereby obtaining a ceramic honeycomb filter having both low pressure loss and high strength.

When the mode diameter of silica particles is less than 30 μm, there are few pores contributing to low pressure loss, failing to provide a ceramic honeycomb filter with low pressure loss. When the mode diameter exceeds 70 μm, the ceramic honeycomb filter does not have sufficient strength. Said mode diameter is preferably 40-60 μm.

When silica particles having particle sizes of 200 μm or more are more than 1%, and/or when silica particles having particle sizes of 100 μm or more are more than 10%, many large pores are formed, resulting in a ceramic honeycomb filter with reduced strength. The silica particles having particle sizes of 200 μm or more are preferably 0.8% or less, and the silica particles having particle sizes of 100 μm or more are preferably 5% or less. With more than 10% of silica particles having particle sizes of 20 μm or less, pores having pore sizes of less than 10 μm increase, resulting in fewer pores having particle sizes exceeding 10 μm, and thus a ceramic honeycomb filter with deteriorated pressure loss. With less than 2% of silica particles having particle sizes of 20 μm or less, the volume of pores having pore sizes of less than 10 μm is less than 3% of the total pore volume, resulting in insufficient communicability of pores, and thus deteriorated pressure loss.

When the silica particles have a mode diameter of 30-70 μm and a particle size distribution deviation SD of more than 0.5, particles having particle sizes of 200 μm or more being 1% or less, particles having particle sizes of 100 μm or more being 2-10%, and particles having particle sizes of 20 μm or less being 2-10%, a broad particle size distribution is obtained, resulting in a broad pore size distribution. As a result, there are higher percentages of pores adversely affecting pressure loss and strength, failing to obtain a ceramic honeycomb filter having both low pressure loss and high strength. The particle size distribution deviation SD is preferably 0.4 or less, more preferably 0.3 or less. Silica particles having the above desired particle size distribution can be obtained by classifying silica particles, mixing pluralities of silica particles classified to different particle sizes at controlled ratios, or optimizing pulverization conditions.

The silica particles may be crystalline or amorphous, and amorphous silica is more preferable from the aspect of controlling the particle size distribution. Amorphous silica can be obtained by pulverizing ingots produced by melting high-purity, natural silica stones at high temperatures. Silica particles may contain $Na_2O$, $K_2O$ and $CaO$ as impurities, but the total amount of said impurities is preferably 0.1% or less to prevent a large thermal expansion coefficient.

1-10% of the pore-forming material is preferably added to said cordierite-forming material. The pore-forming material is burned off at lower temperatures (for instance, 1000° C. or lower) before sintering to synthesize cordierite, thereby forming pores. When the pore-forming material is less than 1%, a small amount of pores are formed by the pore-forming material, failing to obtain a ceramic honeycomb filter with low pressure loss. When the pore-forming material is more than 10%, too many pores are formed, failing to keep sufficient strength. The pore-forming material is preferably 2-6%.

The pore-forming material may be known flour, graphite, starch, polyethylene, polyethylene terephthalate, foaming resins such as acrylic microcapsules, etc., and the foaming resins of methyl methacrylate-acrylonitrile copolymers are particularly preferable. Said foaming resins may be unfoamed or foamed, and foamed resins are more preferable.

The pore-forming material particles preferably have a mode diameter of 30-70 μm. When the mode diameter is less than 30 μm, few pores contributing to low pressure loss are formed, failing to provide a ceramic honeycomb filter with low pressure loss. When the mode diameter exceeds 70 μm, large pores are formed, resulting in insufficient strength. The pore-forming material particles more preferably have a mode diameter of 40-60 μm.

Said pore-forming material preferably has a particle size distribution deviation SD of 0.5 or less. Having a particle size distribution deviation SD of 0.5 or less, said pore-forming material provides a sharp pore size distribution, resulting in more pores contributing to low pressure loss without adversely affecting strength. As a result, porous cell walls having the pore structure of the present invention can be formed to provide a ceramic honeycomb filter having both low pressure loss and high strength.

When the pore-forming material has a mode diameter of 30-70 μm, a broad particle size distribution is obtained, resulting in a broad pore size distribution. Accordingly, more pores adversely affecting pressure loss and strength are formed, failing to obtain a ceramic honeycomb filter having both low pressure loss and high strength. Said pore-forming material preferably has a particle size distribution deviation SD of 0.4 or less.

The absolute difference $|M_{50}-m_{50}|$ between the mode diameter $M_{50}$ of said silica and the mode diameter $m_{50}$ of said pore-forming material is preferably 15 μm or less. With $|M_{50}-m_{50}|$ of 15 μm or less, the silica and the pore-forming material have similar particle size distributions, pores formed by sintering silica and pores formed by burning the pore-forming material have similar pore size distribution. As a result, more pores contributing to low pressure loss without adversely affecting strength are formed, resulting in a ceramic honeycomb filter having both low pressure loss and high strength. $|M_{50}-m_{50}|$ is preferably 10 μm or less, more preferably 8 μm or less, most preferably 6 μm or less. The absolute difference $|M_{50'}-m_{50}|$ between the mode diameter $M_{50'}$ of talc in the cordierite-forming material and the mode diameter $m_{50}$ of said pore-forming material may also be 15 μm or less.

The difference of $SD_1$ and $SD_2$ ($SD_1-SD_2$), wherein $SD_1$ is the particle size distribution deviation of said silica, and $SD_2$ is the particle size distribution deviation of the pore-forming material, is preferably 0.3 or less. With ($SD_1-SD_2$) of 0.3 or less, the silica and the pore-forming material have substantially similar particle size distribution deviations, so that pores formed by sintering the silica and pores formed by burning the pore-forming material have substantially similar pore size distribution deviations. As a result, more pores contributing to low pressure loss without adversely affecting strength are formed, resulting in a ceramic honeycomb filter having both low pressure loss and high strength. $SD_1-SD_2$ is preferably 0.2 or less, more preferably 0.1 or less. The difference of $SD_3$ and $SD_2$ ($SD_3-SD_2$), wherein $SD_3$ is the particle size distribution deviation of talc in the cordierite-forming material, and $SD_2$ is the particle size distribution deviation of the pore-forming material, may also be 0.3 or less.

Said silica preferably has roundness of 0.6 or more. When the roundness of said silica is 0.6 or more, pores formed by sintering silica are so spherical that stress is not concentrated on them, resulting in porous cell walls with high strength. When the roundness of the silica is less than 0.6, stress tends to be concentrated on pores formed by sintering silica, resulting in porous cell walls with low strength. The roundness of the silica is more preferably 0.7 or more. The roundness of silica particles is determined by image analysis of their electron photomicrograph, and represented by a ratio of a projected area of a silica particle to the area of a circle having the maximum diameter connecting two points on a periphery of the particle and passing a center of gravity of the silica particle.

Figure 6:
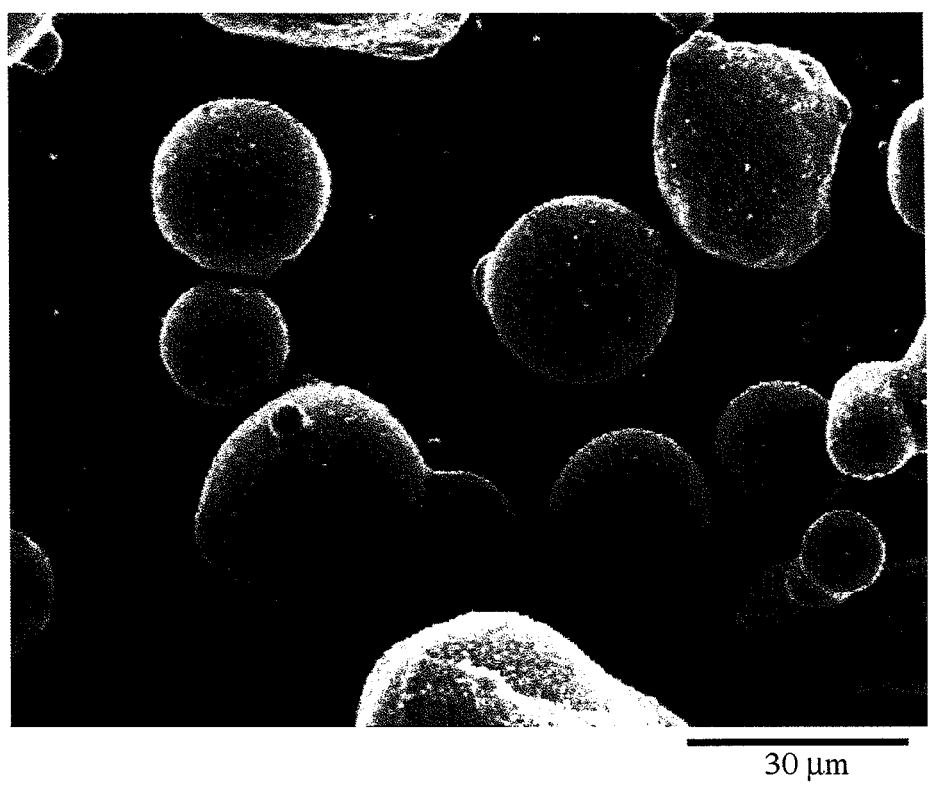
FIG. 6 is an electron photomicrograph showing one example of spheroidal silica.

High-roundness silica particles are obtained by finely pulverizing high-purity, natural silica stones, and ejecting molten silica into high-temperature flame. With such steps, silica particles are simultaneously melted and made spherical, forming spherical, amorphous silica as shown in FIG. 6. The spheroidal silica particles are preferably provided with particle sizes controlled by a method such as classification.

In the production method of the present invention, it is important to control the particle size distribution of silica as described above. Accordingly, it is preferable in the present invention to form a plasticized moldable material for extrusion by adding a pore-forming material and a binder to a cordierite-forming material comprising silica particles, talc particles, kaolin particles, alumina particles, etc, mixing them by a mixing apparatus using no pulverizing medium such as a Henschel mixer, and blending them with water. Mixing by a mixing apparatus using no pulverizing medium silica particles prevents amorphous silica particles from being pulverized particularly in the mixing step, so that silica particles having the desired particle size distribution and particles shape are contained as they are in the extruded molding. Accordingly, a ceramic honeycomb filter having both low pressure loss and high strength can be obtained. Particularly when spheroidal silica is used, the above mixing method has large effects. When a mixing apparatus comprising a pulverizing medium such as a ball mill is used in the mixing step, silica particles, particularly spheroidal silica particles, are undesirably pulverized in the mixing step, resulting in changed shapes and particle sizes.

The present invention will be explained in further detail by Examples below without intention of restricting the present invention thereto.

Example 1

Starting material powders comprising pulverized amorphous silica (particle size distribution deviation $SD_1$=0.45, mode diameter $M_{50}$=30.5 μm, the percentage of particles of 200 μm or more=0.9%, the percentage of particles of 100 μm or more=4.0%, the percentage of particles of 20 μm or less=8.5%, roundness=0.4, and containing 0.005% by mass of $CaO+Na_2O+K_2O$ as impurities), kaolin (average particle size=3.0 μm, and containing 0.32% by mass of $CaO+Na_2O+K_2O$ as impurities), talc (average particle size=12 μm, and containing 0.5% by mass of $CaO+Na_2O+K_2O$ as impurities), alumina (average particle size=4.2 μm, and containing 0.3% by mass of $CaO+Na_2O+K_2O$ as impurities), aluminum hydroxide (average particle size=1.8 μm, and containing 0.05% by mass of $CaO+Na_2O+K_2O$ as impurities) were mixed in the amounts shown in Table 1, to form a cordierite-forming material powder. This cordierite-forming material powder was dry-mixed with a pore-forming material of a foamed resin having a particle size distribution deviation $SD_2$ and a mode diameter $m_{50}$ shown in Table 1, and methylcellulose in a Henschel mixer, wet-mixed with water, and then blended in a blender to form a plasticized, moldable, ceramic material. This moldable material was extruded, dried, and then sintered at the maximum temperature of 1400° C. in a furnace to produce two ceramic honeycomb structures of 267 mm in outer diameter, 304 mm in length, 1.57 mm in cell wall pitch and 0.3 mm in cell wall thickness.

The particle characteristics of the powders and the pore-forming material used were measured by a particle size distribution analyzer (MT3000) of Microtrac. The roundness of silica particles was determined by selecting 20 particles from an electron photomicrograph, measuring the projected area of each silica particle and the area of a circle having the maximum diameter connecting two points on a periphery of the silica particle through its center of gravity by an image analyzer (Image-Pro Plus ver. 3.0 available from Media Cybernetics), calculating the roundness of each particle [(projected area of silica particle)/(area of a circle having the maximum diameter connecting two points on a periphery of each silica particle through its center of gravity)×100 (%)], and averaging them.

Examples 2-7 and Comparative Examples 5-7

Two ceramic honeycomb structures of 267 mm in outer diameter, 304 mm in length, 1.57 mm in cell wall pitch and 0.3 mm in cell wall thickness were produced in each of Examples 2-7 and Comparative Examples 5-7, in the same manner as in Example 1 except for changing the particle characteristics and amount of silica powder, the amounts of talc powder, kaolin powder, alumina powder and aluminum hydroxide powder, and the particle characteristics and amount of the pore-forming material as shown in Table 1.

Examples 8-17, and Comparative Examples 1-4 and 8

Using spherical, amorphous silica powder obtained by ejecting finely pulverized, high-purity, natural silica stones into high-temperature flame, whose particle characteristics are shown in Table 1, in the amount shown in Table 1, two ceramic honeycomb structures of 267 mm in outer diameter, 304 mm in length, 1.57 mm in cell wall pitch and 0.3 mm in cell wall thickness were produced in each of Examples 8-17 and Comparative Examples 1-4 and 8, in the same manner as in Example 1 except for changing the amounts of talc powder, silica powder, kaolin powder, alumina powder and aluminum hydroxide powder, and the particle characteristics and amount of the pore-forming material as shown in Table 1. The particle size distribution of silica used in Example 11 is shown in FIG. 4.

The flow path ends of each ceramic honeycomb structure were alternately plugged with a plugging slurry comprising a cordierite-forming material, dried and sintered to produce two cordierite-based ceramic honeycomb filters in each of Examples 1-17 and Comparative Examples 1-8. The length of the plugging material in the flow paths was controlled to 7-10 mm.

One of the resultant ceramic honeycomb filters in each of Examples 1-17 and Comparative Examples 1-8 was used for the evaluation of pressure loss while capturing soot. The pressure loss while capturing soot was determined by introducing 3 g/h of carbon powder having a particle size of 0.042 μm at an air flow rate of 10 $Nm^3$/min into each ceramic honeycomb filter fixed to a pressure loss test stand, and measuring pressure difference (pressure loss) between the inlet side and the outlet side of the filter when 2 g of soot was accumulated per 1 liter of the filter volume, and evaluated by the following standard. The results are shown in Table 2.

Excellent The pressure loss was 1.2 kPa or less.

Good The pressure loss was more than 1.2 kPa and 1.4 kPa or less.

Fair The pressure loss was more than 1.4 kPa and 1.5 kPa or less.

Poor The pressure loss was more than 1.5 kPa.

A test piece cut out of another ceramic honeycomb filter in each of Examples 1-17 and Comparative Examples 1-8 was measured with respect to porosity, average pore size, pore size distribution deviation σ=log(D20)−log (D80), thermal expansion coefficient and A-axis compression strength.

The porosity, the average pore size and the pore size distribution deviation σ=log(D20)−log(D80) were measured by mercury porosimetry. A test piece (10 mm×10 mm×10 mm) cut out of each ceramic honeycomb filter was put in a measurement cell of Autopore III available from Micromeritics, and the measurement cell was evacuated and pressurized by introducing mercury. From the relation of the pressure and the volume of mercury intruded into pores in the test piece, the relation of a pore size and a cumulative pore volume was determined. The mercury-introducing pressure was 0.5 psi ($0.35 \times 10^{-3}$ $kgf/mm^2$), and the pore size was calculated from the pressure using a contact angle of 130°, and a surface tension of 484 dyne/cm. The porosity was calculated from the measured total pore volume, assuming that cordierite had a true specific gravity of 2.52 $g/cm^3$. The results are shown in Table 2. The relation between the pore size and the pore volume in Example 11 is shown in FIG. 4.

The thermal expansion coefficient was determined by cutting a test piece having a cross section of 4.5 mm×4.5 mm×50 mm (length) out of the filter longitudinally along its flow paths, and heating the test piece from room temperature to 800° C. at a temperature-elevating speed of 10° C./min under a constant load of 20 g to measure the increased length of the test piece by a compression-load-type, differential-thermal-expansion, thermomechanical analyzer (TMA, ThermoPlus available from Rigaku Corp.), and averaging it between 40° C. and 800° C.

The A-axis compression strength was measured according to "Test Method of Monolith Ceramic Carrier for Exhaust-Gas-Cleaning Catalysts for Automobiles," M505-87 of the Society of Automotive Engineers of Japan, and evaluated by the following standard. The results are shown in Table 2.

Excellent The A-axis compression strength was 6.0 MPa or more.

Good The A-axis compression strength was 5.0 MPa or more and less than 6.0 MPa.

Fair The A-axis compression strength was 4.0 MPa or more and less than 5.0 MPa.

Poor The A-axis compression strength was less than 4.0 MPa.

TABLE 1

| | | Silica | | | |
|---|---|---|---|---|---|
| No. | Shape | Particle Size Distribution Deviation $SD_1$ [log (μm)] | Mode Diameter $M_{50}$ (μm) | Percentage Of Particles Of 200 μm Or More (%) | Percentage Of Particles Of 100 μm Or More (%) |
| Example 1 | Pulverized | 0.45 | 30.5 | 0.9 | 4.0 |
| Example 2 | Pulverized | 0.45 | 30.5 | 0.9 | 4.0 |
| Example 3 | Pulverized | 0.45 | 30.5 | 0.9 | 4.0 |
| Example 4 | Pulverized | 0.45 | 30.5 | 0.9 | 4.0 |
| Example 5 | Pulverized | 0.43 | 48.1 | 0.8 | 3.0 |
| Example 6 | Pulverized | 0.46 | 47.1 | 0.7 | 3.0 |
| Example 7 | Pulverized | 0.50 | 62.2 | 0.9 | 3.0 |
| Example 8 | Spherical | 0.35 | 48.7 | 0.6 | 3.0 |
| Example 9 | Spherical | 0.39 | 44.0 | 0.7 | 3.0 |
| Example 10 | Spherical | 0.33 | 43.0 | 0.6 | 3.0 |
| Example 11 | Spherical | 0.35 | 48.7 | 0.6 | 5.0 |
| Example 12 | Spherical | 0.38 | 50.0 | 0.9 | 7.0 |
| Example 13 | Spherical | 0.35 | 48.7 | 0.6 | 3.0 |
| Example 14 | Spherical | 0.35 | 48.7 | 0.6 | 3.0 |
| Example 15 | Spherical | 0.35 | 48.7 | 0.6 | 3.0 |
| Example 16 | Spherical | 0.35 | 48.7 | 0.6 | 3.0 |
| Example 17 | Spherical | 0.35 | 48.7 | 0.6 | 3.0 |
| Comparative Example 1 | Spherical | 0.64 | 35.2 | 3.0 | 15.0 |
| Comparative Example 2 | Spherical | 0.63 | 35.0 | 4.0 | 15.0 |
| Comparative Example 3 | Spherical | 0.68 | 27.5 | 8.0 | 20.0 |
| Comparative Example 4 | Spherical | 0.68 | 40.1 | 9.0 | 20.0 |
| Comparative Example 5 | Pulverized | 0.94 | 20.0 | 0.0 | 1.5 |
| Comparative Example 6 | Pulverized | 0.56 | 37.0 | 0.0 | 3.5 |
| Comparative Example 7 | Pulverized | 0.61 | 51.0 | 2.0 | 15.0 |
| Comparative Example 8 | Spherical | 0.35 | 48.7 | 0.6 | 3.0 |

| | Silica | | | |
|---|---|---|---|---|
| No. | Percentage Of Particles Of 20 μm Or Less (%) | Roundness | Amount (% by mass) | Impurities[1] (% by mass) |
| Example 1 | 8.5 | 0.4 | 17.5 | 0.005 |
| Example 2 | 8.5 | 0.4 | 17.5 | 0.005 |

TABLE 1-continued

| | | | | |
|---|---|---|---|---|
| Example 3 | 8.5 | 0.4 | 17.5 | 0.005 |
| Example 4 | 8.5 | 0.4 | 17.5 | 0.005 |
| Example 5 | 5.5 | 0.4 | 17.5 | 0.006 |
| Example 6 | 5.5 | 0.4 | 17.5 | 0.006 |
| Example 7 | 6.0 | 0.4 | 17.5 | 0.006 |
| Example 8 | 7.0 | 0.8 | 17.5 | 0.006 |
| Example 9 | 7.0 | 0.9 | 18.0 | 0.005 |
| Example 10 | 9.0 | 0.8 | 18.0 | 0.005 |
| Example 11 | 5.0 | 0.8 | 18.0 | 0.005 |
| Example 12 | 6.5 | 0.9 | 18.0 | 0.005 |
| Example 13 | 7.0 | 0.8 | 12.0 | 0.005 |
| Example 14 | 7.0 | 0.8 | 18.0 | 0.005 |
| Example 15 | 7.0 | 0.8 | 20.0 | 0.005 |
| Example 16 | 7.0 | 0.8 | 17.5 | 0.006 |
| Example 17 | 7.0 | 0.8 | 17.5 | 0.006 |
| Comparative Example 1 | 3.0 | 0.8 | 16.0 | 0.006 |
| Comparative Example 2 | 3.0 | 0.9 | 16.0 | 0.006 |
| Comparative Example 3 | 1.5 | 0.8 | 16.0 | 0.005 |
| Comparative Example 4 | 3.5 | 0.7 | 16.0 | 0.006 |
| Comparative Example 5 | 59.3 | 0.2 | 16.0 | 0.006 |
| Comparative Example 6 | 31.7 | 0.2 | 16.0 | 0.006 |
| Comparative Example 7 | 16.1 | 0.2 | 16.0 | 0.006 |
| Comparative Example 8 | 7.0 | 0.8 | 9.0 | 0.005 |

Note:
[1] The total amount of CaO, $Na_2O$ and $K_2O$ present as impurities in silica.

| | Amounts (% by mass) | | | |
|---|---|---|---|---|
| No. | Kaolin | Talc | Alumina | Aluminum Hydroxide |
| Example 1 | 7.6 | 41.0 | 22.8 | 11.1 |
| Example 2 | 7.6 | 41.0 | 22.8 | 11.1 |
| Example 3 | 7.6 | 41.0 | 22.8 | 11.1 |
| Example 4 | 7.6 | 41.0 | 22.8 | 11.1 |
| Example 5 | 7.6 | 41.0 | 22.8 | 11.1 |
| Example 6 | 7.6 | 41.0 | 22.8 | 11.1 |
| Example 7 | 7.6 | 41.0 | 22.8 | 11.1 |
| Example 8 | 7.6 | 41.0 | 22.8 | 11.1 |
| Example 9 | 6.2 | 41.1 | 23.3 | 11.3 |
| Example 10 | 6.2 | 41.1 | 23.3 | 11.3 |
| Example 11 | 6.2 | 41.1 | 23.3 | 11.3 |
| Example 12 | 6.2 | 41.1 | 23.3 | 11.3 |
| Example 13 | 18.9 | 40.8 | 19.2 | 9.2 |
| Example 14 | 6.2 | 41.1 | 23.3 | 11.3 |
| Example 15 | 1.7 | 41.4 | 24.8 | 12.0 |
| Example 16 | 7.6 | 41.0 | 22.8 | 11.1 |
| Example 17 | 7.6 | 41.0 | 22.8 | 11.1 |
| Comparative Example 1 | 10.3 | 41.0 | 22.0 | 10.6 |
| Comparative Example 2 | 10.3 | 41.0 | 22.0 | 10.6 |
| Comparative Example 3 | 10.3 | 41.0 | 22.0 | 10.6 |
| Comparative Example 4 | 10.3 | 41.0 | 22.0 | 10.6 |
| Comparative Example 5 | 10.3 | 41.0 | 22.0 | 10.6 |
| Comparative Example 6 | 10.3 | 41.0 | 22.0 | 10.6 |
| Comparative Example 7 | 10.3 | 41.0 | 22.0 | 10.6 |
| Comparative Example 8 | 19.0 | 41.0 | 17.4 | 8.4 |

TABLE 1-continued

| No. | Pore-Forming Material Particle Size Distribution Deviation $SD_2$ [log (μm)] | Mode Diameter $m_{50}$ (μm) | Amount[1] (parts by mass) | $|M_{50} - m_{50}|$ (μm) | $SD_1 - SD_2$ [log (μm)] |
|---|---|---|---|---|---|
| Example 1 | 0.29 | 48.0 | 2.5 | 17.5 | 0.16 |
| Example 2 | 0.29 | 48.0 | 3.5 | 17.5 | 0.16 |
| Example 3 | 0.29 | 48.0 | 4.5 | 17.5 | 0.16 |
| Example 4 | 0.29 | 48.0 | 6.0 | 17.5 | 0.16 |
| Example 5 | 0.29 | 48.0 | 5.6 | 0.1 | 0.14 |
| Example 6 | 0.29 | 48.0 | 5.6 | 0.9 | 0.17 |
| Example 7 | 0.29 | 48.0 | 6.0 | 14.3 | 0.21 |
| Example 8 | 0.29 | 48.0 | 4.5 | 0.7 | 0.06 |
| Example 9 | 0.29 | 48.0 | 6.0 | 4.0 | 0.10 |
| Example 10 | 0.29 | 48.0 | 5.1 | 5.0 | 0.04 |
| Example 11 | 0.29 | 48.0 | 5.1 | 0.7 | 0.06 |
| Example 12 | 0.29 | 45.2 | 5.6 | 4.8 | 0.09 |
| Example 13 | 0.29 | 48.0 | 5.1 | 0.7 | 0.06 |
| Example 14 | 0.29 | 48.0 | 5.1 | 0.7 | 0.06 |
| Example 15 | 0.29 | 48.0 | 5.1 | 0.7 | 0.06 |
| Example 16 | 0.28 | 41.0 | 4.5 | 7.7 | 0.07 |
| Example 17 | 0.28 | 56.0 | 4.5 | 7.4 | 0.07 |
| Comparative Example 1 | 0.29 | 48.0 | 1.5 | 12.8 | 0.35 |
| Comparative Example 2 | 0.29 | 48.0 | 6.5 | 13.0 | 0.34 |
| Comparative Example 3 | 0.29 | 48.0 | 5.6 | 20.5 | 0.39 |
| Comparative Example 4 | 0.55 | 44.2 | 6.0 | 4.1 | 0.13 |
| Comparative Example 5 | 0.55 | 44.2 | 6.0 | 24.2 | 0.39 |
| Comparative Example 6 | 0.55 | 44.2 | 6.0 | 7.2 | 0.01 |
| Comparative Example 7 | 0.55 | 44.2 | 6.0 | 6.8 | 0.06 |
| Comparative Example 8 | 0.29 | 48.0 | 5.1 | 0.7 | 0.06 |

Note:
[1] The amount per 100 parts by mass of cordierite-forming material powder.

TABLE 2

| No. | Total Pore Volume (cm³/g) | Porosity (%) | Average Pore Size (μm) | Pore Distribution Deviation σ [log (μm)] |
|---|---|---|---|---|
| Example 1 | 0.33 | 45 | 17.6 | 0.60 |
| Example 2 | 0.37 | 48 | 18.0 | 0.59 |
| Example 3 | 0.40 | 50 | 17.9 | 0.58 |
| Example 4 | 0.55 | 58 | 17.6 | 0.60 |
| Example 5 | 0.52 | 57 | 19.1 | 0.55 |
| Example 6 | 0.53 | 57 | 19.2 | 0.54 |
| Example 7 | 0.55 | 58 | 24.0 | 0.59 |
| Example 8 | 0.51 | 56 | 23.0 | 0.45 |
| Example 9 | 0.55 | 58 | 20.0 | 0.53 |
| Example 10 | 0.51 | 56 | 21.0 | 0.45 |
| Example 11 | 0.51 | 56 | 25.2 | 0.40 |
| Example 12 | 0.53 | 57 | 23.0 | 0.59 |
| Example 13 | 0.40 | 50 | 20.2 | 0.40 |
| Example 14 | 0.51 | 56 | 26.0 | 0.40 |
| Example 15 | 0.53 | 57 | 25.0 | 0.40 |
| Example 16 | 0.52 | 57 | 17.0 | 0.58 |
| Example 17 | 0.55 | 58 | 28.0 | 0.59 |
| Comparative Example 1 | 0.27 | 40 | 18.0 | 0.62 |
| Comparative Example 2 | 0.56 | 59 | 18.1 | 0.61 |
| Comparative Example 3 | 0.54 | 57 | 14.8 | 0.63 |
| Comparative Example 4 | 0.54 | 58 | 19.8 | 0.68 |
| Comparative Example 5 | 0.51 | 56 | 19.8 | 0.64 |
| Comparative Example 6 | 0.54 | 58 | 19.8 | 0.68 |
| Comparative Example 7 | 0.58 | 59 | 19.8 | 0.68 |
| Comparative Example 8 | 0.38 | 49 | 18.2 | 0.41 |

| No. | Pore Distribution Volume Of Pores Of Less Than 10 μm (%) | Volume Of Pores Of More Than 50 μm (%) | Volume Of Pores Of 100 μm Or More (%) |
|---|---|---|---|
| Example 1 | 3.3 | 10 | 1.0 |
| Example 2 | 3.3 | 10 | 1.0 |
| Example 3 | 3.5 | 11 | 1.5 |
| Example 4 | 3.5 | 11 | 1.5 |
| Example 5 | 4.5 | 12 | 2.0 |
| Example 6 | 4.5 | 13 | 2.5 |
| Example 7 | 5.8 | 18 | 3.0 |
| Example 8 | 6.0 | 15 | 3.5 |
| Example 9 | 6.0 | 18 | 3.0 |
| Example 10 | 6.0 | 15 | 3.5 |
| Example 11 | 6.0 | 15 | 3.5 |
| Example 12 | 5.8 | 18 | 4.0 |
| Example 13 | 4.0 | 16 | 4.0 |
| Example 14 | 7.0 | 14 | 3.0 |
| Example 15 | 6.5 | 13 | 2.8 |
| Example 16 | 7.0 | 12 | 2.0 |
| Example 17 | 3.0 | 21 | 6.0 |

TABLE 2-continued

| | | | |
|---|---|---|---|
| Comparative Example 1 | 3.5 | 11 | 1.0 |
| Comparative Example 2 | 3.5 | 11 | 1.0 |
| Comparative Example 3 | 2.5 | 8 | 0.5 |
| Comparative Example 4 | 4.5 | 12 | 2.0 |
| Comparative Example 5 | 15.0 | 12 | 2.0 |
| Comparative Example 6 | 11.0 | 12 | 2.0 |
| Comparative Example 7 | 9.0 | 20 | 5.0 |
| Comparative Example 8 | 3.0 | 9.0 | 3.0 |

| | Evaluation Results | | |
|---|---|---|---|
| No. | Thermal Expansion Coefficient ($\times 10^{-7}/°$ C.) | Soot-Capturing Pressure Loss | A-Axis Strength |
| Example 1 | 8.0 | Fair | Fair |
| Example 2 | 8.0 | Fair | Fair |
| Example 3 | 8.0 | Fair | Fair |
| Example 4 | 8.0 | Fair | Fair |
| Example 5 | 7.0 | Good | Fair |
| Example 6 | 7.0 | Good | Fair |
| Example 7 | 7.0 | Fair | Fair |
| Example 8 | 7.0 | Excellent | Excellent |
| Example 9 | 8.0 | Good | Excellent |
| Example 10 | 8.0 | Excellent | Excellent |
| Example 11 | 8.0 | Excellent | Excellent |
| Example 12 | 8.0 | Good | Good |
| Example 13 | 6.0 | Fair | Excellent |
| Example 14 | 10.0 | Excellent | Good |
| Example 15 | 12.0 | Fair | Excellent |
| Example 16 | 8.0 | Fair | Good |
| Example 17 | 8.0 | Good | Fair |
| Comparative Example 1 | 7.0 | Poor | Fair |
| Comparative Example 2 | 7.0 | Poor | Fair |
| Comparative Example 3 | 7.0 | Poor | Poor |
| Comparative Example 4 | 7.0 | Poor | Poor |
| Comparative Example 5 | 7.0 | Poor | Fair |
| Comparative Example 6 | 7.0 | Poor | Poor |
| Comparative Example 7 | 7.0 | Poor | Poor |
| Comparative Example 8 | 6.0 | Poor | Good |

It is clear from Tables 1 and 2 that the ceramic honeycomb filters of Examples 1-17 within the present invention had low pressure loss, high strength, and a thermal expansion coefficient of $12 \times 10^{-7}/°$ C. or less. Particularly the ceramic honeycomb filters of Examples 8-12 and 14 containing 13-18% by mass of spheroidal silica powder, the absolute difference $|M_{50}-m_{50}|$ between the mode diameter $M_{50}$ of silica particles and the mode diameter $m_{50}$ of the pore-forming material particles being 6 or less, had excellent low pressure loss characteristics and high strength. On the other hand, the ceramic honeycomb filters of Comparative Examples 1-8 failed to have both low pressure loss and high strength.

EFFECT OF THE INVENTION

Having low pressure loss, and strength improved than conventional levels to withstand mechanical vibration and shock, the cordierite-based ceramic honeycomb filters of the present invention are suitable as ceramic honeycomb filters for industrial applications such as construction machines, and large ceramic honeycomb filters having outer diameters of more than 200 mm.

The method of the present invention can produce the cordierite-based ceramic honeycomb filter of the present invention efficiently.

What is claimed is:

1. A cordierite-based ceramic honeycomb filter comprising a honeycomb structure having a large number of flow paths partitioned by porous cell walls, and plugs alternately formed in said flow paths on the exhaust-gas-inlet side or the exhaust-gas-outlet side for permitting an exhaust gas to pass through said porous cell walls to remove particulate matter from the exhaust gas, said porous cell walls having porosity of 45-58%, an average pore size of 15-30 µm, the volume of pores having pore sizes exceeding 50 µm being more than 10% and 25% or less of the total pore volume, the volume of pores having pore sizes of 100 µm or more being 1-8% of the total pore volume, the volume of pores having pore sizes of less than 10 µm being 3-10% of the total pore volume, and said pores having a pore size distribution deviation σ [=log (D20)–log(D80)] of 0.6 or less, wherein D20 represents a pore size (µm) at a pore volume corresponding to 20% of the total pore volume, and D80 represents a pore size (µm) at a pore volume corresponding to 80% of the total pore volume, both in a curve representing the relation between the pore size and the cumulative pore volume (pore volume accumulated in a range from the maximum pore size to a particular pore size), and D80<D20.

2. The cordierite-based ceramic honeycomb filter according to claim 1, wherein said cumulative pore volume is measured by mercury porosimetry.

3. The cordierite-based ceramic honeycomb filter according to claim 1, wherein said ceramic honeycomb structure has A-axis compression strength of 4 MPa or more.

* * * * *